(12) United States Patent
Styles

(10) Patent No.: US 6,997,653 B2
(45) Date of Patent: Feb. 14, 2006

(54) DEBRIS COLLECTION DEVICE AND METHOD

(75) Inventor: Christopher Styles, Waltham Cross (GB)

(73) Assignee: Dustbubble Limited, London (GB)

( * ) Notice: Subject to any disclaimer, the term of this patent is extended or adjusted under 35 U.S.C. 154(b) by 0 days.

(21) Appl. No.: 10/181,369

(22) PCT Filed: Jan. 19, 2001

(86) PCT No.: PCT/GB01/00197

§ 371 (c)(1),
(2), (4) Date: Jul. 18, 2002

(87) PCT Pub. No.: WO01/53037

PCT Pub. Date: Jul. 26, 2001

(65) Prior Publication Data

US 2003/0000695 A1   Jan. 2, 2003

(30) Foreign Application Priority Data

Jan. 20, 2000   (GB) .................................. 0001310

(51) Int. Cl.
*B23B 47/34*   (2006.01)
(52) U.S. Cl. .................... 408/67; 383/105; 220/480; 206/460; 206/813; 15/257.1; 408/1 R
(58) Field of Classification Search .............. 408/67, 408/72 R, 1 R; 383/105; 220/480, 481; 248/205.3, 311.2; 206/460, 813; 15/257.1
See application file for complete search history.

(56) References Cited

U.S. PATENT DOCUMENTS

| | | | | |
|---|---|---|---|---|
| 5,911,324 A | * | 6/1999 | Hammer | 206/527 |
| 5,915,839 A | * | 6/1999 | Dennis | 383/11 |
| 2002/0145033 A1 | * | 10/2002 | Dakolios | 229/117.23 |
| 2004/0120607 A1 | * | 6/2004 | Goren | 383/22 |

FOREIGN PATENT DOCUMENTS

| | | | |
|---|---|---|---|
| DE | 3631360 | * | 3/1988 |
| DE | 19520377 | * | 1/1996 |
| DE | 29601940 U1 | * | 5/1996 |
| DE | 19527171 | * | 11/1996 |
| DE | 29706467 U1 | * | 8/1997 |
| DE | 19719484 | * | 11/1998 |
| DE | 19720565 | * | 11/1998 |
| DE | 29900361 U1 | * | 5/1999 |
| DE | 29917592 U1 | * | 3/2000 |
| DE | 29920353 U1 | * | 4/2000 |
| EP | 0401520 | * | 12/1990 |
| EP | 0443445 | * | 2/1991 |
| FR | 2645785 | * | 10/1990 |
| FR | 2705599 | * | 12/1994 |
| FR | 2795351 | * | 12/2000 |
| FR | 2823689 | * | 10/2002 |
| GB | 2163723 | * | 3/1986 |
| GB | 2196111 | * | 4/1988 |
| GB | 2212080 | * | 7/1989 |
| GB | 2230483 | * | 10/1990 |

(Continued)

Primary Examiner—Daniel W. Howell
(74) Attorney, Agent, or Firm—Baker Botts, LLP

(57) ABSTRACT

A collection device for use with a drill to capture debris ejected from drilling into a surface includes a body formed of flexible material having a first, substantially flat, configuration and a second erect configuration defining a cavity. The body includes a hole for receiving a drill bit into the cavity when the body is erect and adhesive means for adhering the body to the surface.

18 Claims, 2 Drawing Sheets

FOREIGN PATENT DOCUMENTS

| | | | |
|---|---|---|---|
| GB | 2274706 | * | 8/1994 |
| GB | 2293005 | * | 3/1996 |
| GB | 2341334 | * | 3/2000 |
| GB | 2348159 | * | 9/2000 |
| GB | 2348386 | * | 10/2000 |
| GB | 2364375 | * | 1/2002 |
| GB | 2365411 | * | 2/2002 |
| GB | 2383965 | * | 7/2003 |
| JP | 61-219509 | * | 9/1986 |
| SU | 814655 | * | 3/1981 ... 408/67 |
| WO | 88/10170 | * | 12/1988 |
| WO | 96/30147 | * | 10/1996 |
| WO | 99/24217 | * | 5/1999 |
| WO | 00/07766 | * | 2/2000 |
| WO | 03/045623 | * | 6/2003 |

* cited by examiner

DEBRIS COLLECTION DEVICE AND METHOD

FIELD OF THE INVENTION

The present invention relates to a debris collection device for collecting dirt, debris and the like that is particularly useful when used in conjunction with rotary drills.

BACKGROUND TO THE PRESENT INVENTION

When drilling into surfaces using a standard rotary drill, the material drilled out of the surface is normally carried back along the length of the drill and scattered as granular dust or grit in the area directly below where the hole is being drilled. In some cases the quantity of debris generated by drilling a hole is particularly noticeable, for instance, a 10 mm hole at a 5 cm depth will create nearly 4 $cm^3$ of debris that will be scattered about the immediate area, the majority forming a pile immediately below the hole. Whilst in many industrial environments such debris would be unnoticeable, this is not the case in the home. Particularly in the DIY environment, the house-proud occupant and/or their spouse are likely to require sheeting to be put down in the vicinity around the drilling and for the area to be vacuumed immediately afterwards to avoid making the house dirty with the dust and debris. Furthermore, tables and ornaments must either be covered or removed unless they are to be thoroughly cleaned afterwards.

A related complaint is often raised against service installers (telecommunications and cable TV installers in particular) who drill many holes at a customers house to install their services, but rarely clean up after themselves.

In many circumstances it is highly desirable for the dust and debris failing from a drilling operation to be completely collected without large amounts of preparation by laving sheets and alike. In particular, in installing fixtures in a newly decorated room or drilling holes near sensitive electronic equipment that cannot easily be moved and the debris may be potentially damaging to the equipment, a simple debris collection mechanism should be desirable.

Other than using sheeting to catch the majority of the debris, no simple and inexpensive mechanisms for controlling the spread of such debris is known to be available to small-scale installation operators or to the home DIY market. Complex systems involving vacuums to suck away the dust have been developed over the years, but this usually requires additional vacuum pumps and ducting, and the vacuum is rarely powerful enough to carry all the dust and debris away.

UK patent publication number 2278190 discloses a hand tool for use with a drill. The hand tool includes a hollow body of solid construction having a through hole through which a drill bit may pass. The hand tool is held against a surface to be drilled using a handle and during drilling debris from drilling passes into the hollow body. Such a tool partially solves the problems of capturing dust and debris created while drilling. However, the tool requires a hand to hold it to the wall leaving only one hand to hold and guide a drill which for many people is not enough. If a heavy drill is used or the user needs two hands to hold or guide the drill, a further person would have to be involved to use the hand tool. The tool is only usable if drilling is perpendicular to the surface to be drilled due to the alignment of the through holes and solid body. In addition, the user's hand is close to the drill bit when drilling which may prove to be unsafe.

Furthermore, having a solid body exposes the hand tool to wear around the portions that contact the drill bit. This is addressed by use of a chuck-impact ring shield or washer in the above document. However, the use of a combination of parts, some of which must be removable and replaceable increases the complexity and overall cost of the device.

STATEMENT OF INVENTION

According to one aspect of the present invention, there is provided a collection device for use with a drill to capture debris ejected from drilling into a surface comprising a body formed of flexible material having a first, substantially flat, configuration and a second, erect, configuration defining a cavity, a hole for receiving a drill bit into the cavity when the body is erect and adhesive means for adhering the body to the surface.

In use the device envelops the portions of the drill bit that carry dust and debris out of the drilled hole. The body is temporarily fixed to the surface such that there is a seal between the body and the surface so that ejected dust, debris and the like has no choice other than to pass into the cavity. Preferably the seal is immediately around the area to be drilled so that no dust is trapped between the body and the surface. In the cavity, the dust and debris either falls off the drill bit into the cavity for collection or is pushed off the surface of the drill bit into the cavity as it reaches the back of the body. The device of the present invention is a simple yet effective construction which may be easily mass produced. Furthermore, depending on the material of construction, the device may be fully re-usable or used a number of times before disposal.

By being temporarily fixed to the surface, the device allows the user's attention and both hands to be used in holding and directing the drilling. Thus, the device solves the problem of capturing dust and debris without increasing the complexity of the drilling action.

The device is supplied in a substantially flattened or flat-packed state that can be opened or otherwise erected to form the cavity prior to, or during use. The flattened or flat-packed device requires minimal packaging for sale and allows the device to be pressed against the surface to attach it.

The first surface may include a number of tabs for use in pulling the first surface away from the second surface to thereby form the cavity. Preferably, the first surface includes two tabs, the tabs being on opposing sides of the through hole. The tabs may form part of a reinforcing portion around the through hole. In order to make devices of cheap, lightweight, material the reinforcing portion, possibly formed as a separate layer, may be arranged around the through hole to counter wear and tear from rubbing of the drill bit.

The joint between the first surface and the second surface may be openable to enable the cavity to be emptied. Alternatively, the body may include a re-sealable opening to enable the cavity to be emptied.

The attachment means preferably comprises an adhesive layer such as double sided sticky tape.

The adhesive layer may include a removable cover for protection of the adhesive when not in use. The body may comprise one of rubber, plastics, reinforced paper/or silicone-based paper.

DESCRIPTION OF THE DRAWINGS

An example of the present invention will now be described in detail with reference to the accompanying drawings in which.

DETAILED DESCRIPTION

Figure 1:
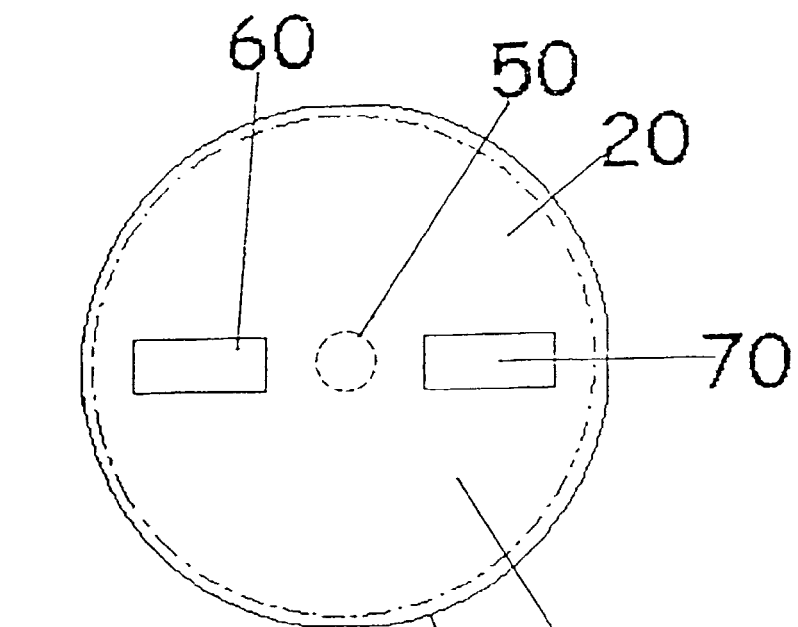
FIGS. 1 and 2 are, respectively, front and rear views of a collection device according to the present invention.
Figure 2:
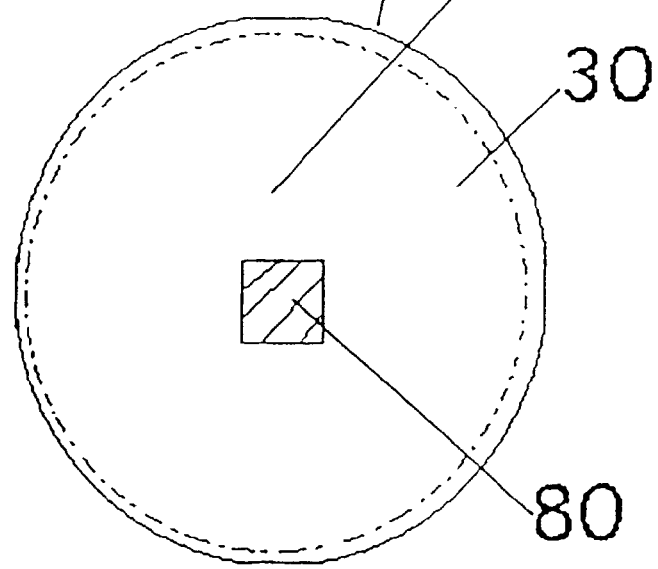

FIGS. 1 and 2 are, respectively, front and rear views of a collection device according to the present invention. The collection device comprises a body 10 having a front surface 20 and a back surface 30. The front and back surfaces 20, 30 are joined to each other around their perimeters (the joint is marked by a dash-dot line) to form an enclosed central area 40. The front surface 20 includes a through hole 50 capable of accepting a drill bit. The through hole 50 is preferably smaller or of the same diameter as the intended drill bit to be used. However, the size of the through hole is not essential to the operation of the device. In practice, a device with a 10 mm hole is used for all drill bits without adverse effect. Equally spaced either side of the through hole 50 are two tabs 60, 70 attached to the front surface 20. The back surface 30 includes an adhesive area 80 permitting adhesion of the body 10 to a surface.

Figure 3:
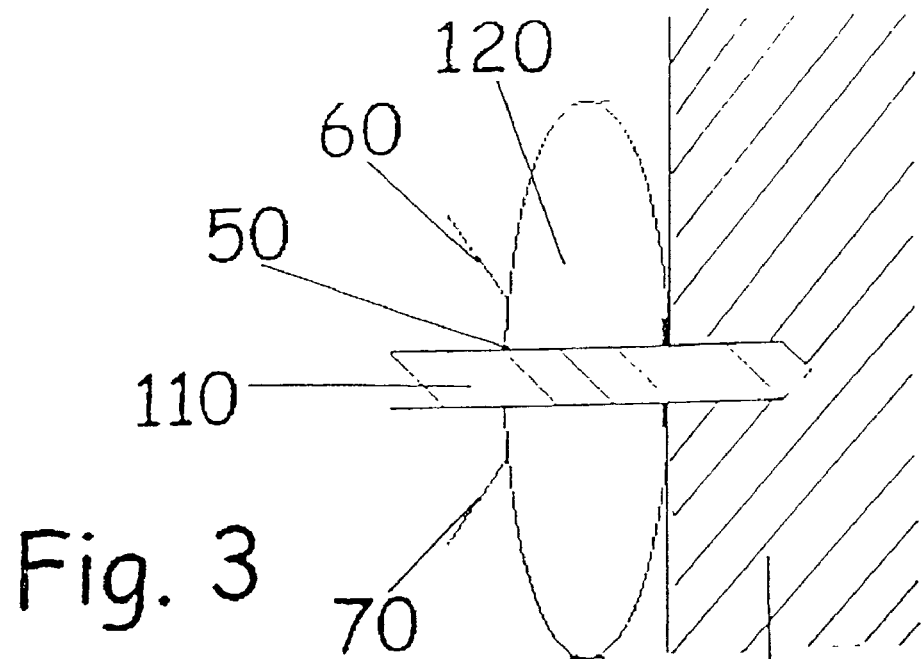
FIG. 3 is a cross-sectional view a collection device according to the present invention when in use: and, FIG. 4 is the cross-sectional drawing of FIG. 3 showing the collected debris.

FIG. 3 is a cross-sectional view of a collection device of FIGS. 1 and 2 when in use. To use the collection device, the body 10 is adhered to a surface 100 such that the through hole 50 is in line with the hole to be drilled. The tip of a drill bit 110 (only part of the length of the drill bit 110 is shown) is pressed against back surface 30 via through hole 50 and tabs 60, 70 are pulled in the direction away from the surface 100. The pulling action forces the hole 50 to expand around the circumference of the drill bit 110 and the front surface to separate from the back surface to form a cavity 120.

Alternatively, the device may be adhered to the surface 100 and erected using the tabs 60, 70 prior to insertion of the drill bit.

Figure 4:
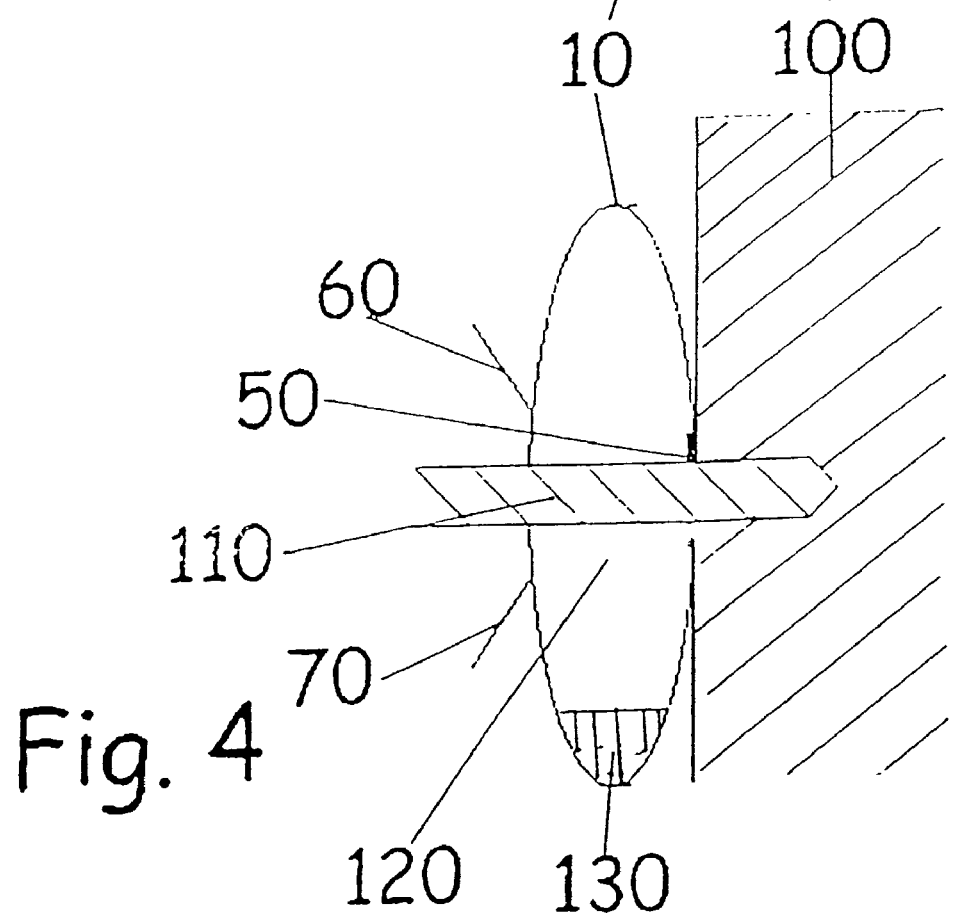

FIG. 4 is the cross-sectional drawing of FIG. 3 showing the collected debris. During the drilling operation, a part of the back surface 30 and adhesive area 80 is drilled away and the drill then enters the surface 100. Due to the remaining seal between the body 10 and the surface 100, dust and debris 130 ejected from drilling into the surface 100 drops from the drill bit 110 into the cavity 120. Once drilling is completed, the body 10 is removed from the surface 100 and can be emptied for further use or disposed of.

The body may be formed from a flexible material that can be flattened but retains its shape when erected. Suitable materials include greaseproof paper, reinforced paper, coated paper, cardboard or silicone-based paper. The adhesive area 80 may be formed from pre-adhered double sided sticky tape or other suitable adhesive. Preferably the adhesive area is screen printed onto the body and a suitable cover is then applied to preserve the adhesive until required.

The material forming the tabs ma be part of the body or may be attached to the body. If the material is attached to the body, it may also extend around the through hole to reinforce it. The tabs may be formed as semi-circles or a circle extending around the hole so that they can be grasped from any orientation.

The size of the body and the cavity it can form will largely depend on the size of the target hole to be drilled, as will the strength of the body of the material. The joint around the circumference of the surfaces may be releasable and re-sealable by way of adhesive, velcro, a zip fastening or the like for the body to be emptied. Alternatively, the body may include a re-sealable opening, such as a zip opening or the like described above, away from the joint permitting the body to be emptied.

The body need not be a two dimensional constriction, forced into three dimensions upon use, instead it could be a three dimensional construction having a shape such as a cuboid, pyramid, or frusto-cone that is folded or otherwise flattened or flat-packed.

The body may be fixed to the surface to be drilled by adhesive applied to be body, double sided sticky tape, gum or similar adhesive materials. Alternatively, suction or some other form of non-marking attachment means may be employed.

A hole may be pre-formed in the back surface for the drill to pass into the surface or it may be formed the first time the device is used.

Although drilling perpendicular to the surface is illustrated, it will be appreciated that drilling at any angle to the surface can be accommodated by the collection device of the present invention merely by changing the angle at which the drill bit is inserted into the collection device.

What is claimed is:

1. A collection device for use with a drill to capture debris ejected during drilling into a working surface, comprising a body formed of a flexible material and comprising a first surface and a second surface, wherein the first surface has a first hole formed therethrough, wherein the second surface comprises means for adhering the body to the working surface, and wherein the body is adapted to shift from a substantially flat configuration to an erect configuration; whereby the expanded body defines a cavity formed between the first surface and the second surface, which cavity receives a drill bit via the first hole; the body further comprising means for shifting the body from the flat configuration to the expanded configuration, wherein the means for shifting the body comprise a plurality of tabs adapted for pulling the body from the flat configuration to the erect configuration.

2. A method of collecting debris ejected whilst drilling into a working surface using a collection device, wherein the collection device comprises a body formed of a flexible material and comprising a first surface and a second surface, wherein the first surface has a first hole formed therethrough, wherein the second surface comprises means for adhering the body to the working surface, and wherein the body is adapted to shift from a substantially flat configuration to an erect configuration; whereby the expanded body defines a cavity formed between the first surface and the second surface, which cavity receives a drill bit via the first hole; the body further comprising means for shifting the body from the flat configuration to the expanded configuration, wherein the means for shifting the body comprise a plurality of tabs adapted for pulling the body from the flat configuration to the erect configuration, the method comprising the steps of:
   adhering the body of the collection device to the working surface,
   erecting the body by pulling at least one of said plurality of tabs to form the erect configuration,
   inserting a drill bit through the first hole into the cavity, and
   drilling through the second surface and into the working surface, whereby debris ejected in the step of drilling is captured in the cavity.

3. The collection device according to claim 1, wherein two tabs are positioned on opposing sides of the first hole.

4. The collection device according to claim 1, wherein one tab surrounds the periphery of the first hole.

5. The collection device according to claim 1, wherein the plurality of tabs form a part of a reinforcing portion positioned around the periphery of the first hole.

6. The collection device according to claim 1, further comprising means for opening the body from the erect configuration to empty debris from the cavity.

7. The collection device according to claim 1, wherein the body further comprises a re-sealable opening formed through the body and between the first surface and the second surface to empty debris from the cavity.

8. The collection device according to claim 1, wherein the means for adhering comprise an adhesive layer.

9. The collection device according to claim 8, wherein the adhesive layer comprises double-sided sticky tape.

10. The collection device according to claim 8, wherein the adhesive layer comprises a removable cover for protection of the adhesive layer when the body is not adhered to the working surface.

11. The collection device according to claim 8, wherein the means for adhering the body to the working surface substantially surrounds an area to be drilled, the second surface has a second hole drilled therethrough, and the means for adhering creates a seal surrounding the second hole and between the second surface and the working surface.

12. The collection device according to claim 1, wherein the flexible material is selected from the group consisting of greaseproof paper, reinforced paper, coated paper, cardboard, and silicone-based paper.

13. The collection device according to claim 1, wherein the first surface and the second surface comprise two substantially identical sheets joined about their respective peripheries to form the body and wherein the body is adapted to shift from the flat configuration to the erect configuration by drawing at least a central part of one of the sheets away from at least a central part of the other of the sheets.

14. The collection device according to claim 13, wherein the two sheets are substantially circular.

15. The collection device according to claim 1, wherein the body in the erect configuration has a shape selected from the group consisting of a cuboid shape, pyramidal shape, and a frusto-conical shape and wherein the body is adapted to be collapsed to shift to the flat configuration.

16. The collection device according to claim 1, wherein the means for adhering is positioned substantially opposite the first hole, when the body is shifted to the erect configuration.

17. The collection device according to claim 1, wherein the first surface having the first hole is adjacent the second surface comprising the means for adhering, when the body is in the flat configuration.

18. The collection device according to claim 1, wherein the second surface has a second hole formed therethrough, such that the second hole is adjacent the working surface when the second surface is adhered to the working surface.

* * * * *